United States Patent
McGuire et al.

(10) Patent No.: US 7,028,229 B2
(45) Date of Patent: Apr. 11, 2006

(54) KERNEL EVENT SUBSCRIPTION AND PUBLICATION SYSTEM AND METHOD

(75) Inventors: Cynthia McGuire, San Jose, CA (US); Jerry Gilliam, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 546 days.

(21) Appl. No.: 10/262,294

(22) Filed: Sep. 30, 2002

(65) Prior Publication Data

US 2004/0064759 A1    Apr. 1, 2004

(51) Int. Cl.
    *G06F 11/00*    (2006.01)
(52) U.S. Cl. .......................... 714/57; 714/38; 714/49; 719/318
(58) Field of Classification Search ................ 714/49, 714/57, 38; 719/318; 717/128
    See application file for complete search history.

(56) References Cited

U.S. PATENT DOCUMENTS

| | | | | |
|---|---|---|---|---|
| 5,291,590 A * | 3/1994 | Ohnishi et al. | ........... | 714/49 |
| 5,673,386 A * | 9/1997 | Batra | ........... | 714/38 |
| 5,787,019 A * | 7/1998 | Knight et al. | ........... | 719/324 |
| 6,182,249 B1 * | 1/2001 | Wookey et al. | ........... | 714/47 |
| 6,275,957 B1 * | 8/2001 | Novik et al. | ........... | 714/39 |
| 6,314,533 B1 * | 11/2001 | Novik et al. | ........... | 714/39 |
| 6,598,169 B1 * | 7/2003 | Warwick et al. | ........... | 713/320 |
| 6,742,051 B1 * | 5/2004 | Bakshi et al. | ........... | 719/318 |
| 6,748,555 B1 * | 6/2004 | Teegan et al. | ........... | 714/38 |
| 6,829,770 B1 * | 12/2004 | Hinson et al. | ........... | 719/318 |
| 6,857,085 B1 * | 2/2005 | Ruhlen et al. | ........... | 714/38 |
| 6,859,829 B1 * | 2/2005 | Parupudi et al. | ........... | 709/224 |
| 2002/0087736 A1 * | 7/2002 | Martin | ........... | 709/312 |
| 2003/0074604 A1 * | 4/2003 | Mathias et al. | ........... | 714/38 |
| 2004/0025171 A1 * | 2/2004 | Barinov et al. | ........... | 719/318 |
| 2004/0040013 A1 * | 2/2004 | Kalra | ........... | 717/129 |
| 2004/0153998 A1 * | 8/2004 | McGuire et al. | ........... | 717/128 |
| 2004/0216137 A1 * | 10/2004 | Warwick et al. | ........... | 719/318 |

\* cited by examiner

*Primary Examiner*—Scott Baderman
*Assistant Examiner*—Joshua Lohn
(74) *Attorney, Agent, or Firm*—Martine Penilla & Gencarella, LLP (57) ABSTRACT

An event subscription and publication system for dynamically notifying user level applications of kernel level events. The kernel level events may include hardware and software events as well as system level errors that occur in the kernel. User level applications that need information on these kernel level events subscribe to the event monitoring and publication framework of the present invention and are notified of these kernel level events when they occur. Upon notification of an event, the user application also is provided with specific information classifying the nature and details of the event. The kernel event monitoring and publication system of the present invention allows user level applications to be dynamically notified of kernel level events without requiring the user level application to interrupt the normal processing states to identify these events when the events occur.

40 Claims, 8 Drawing Sheets

KERNEL EVENT SUBSCRIPTION AND PUBLICATION SYSTEM AND METHOD

FIELD OF THE INVENTION

The present claimed invention relates generally to the field of computer operating systems. More particularly, embodiments of the present claimed invention relate to a system for subscribing and publishing kernel level events to user level applications.

BACKGROUND ART

A computer system can be generally divided into four components: the hardware, the operating system, the application programs and the users. The hardware (e.g., central processing unit (CPU), memory and input/output (I/O) devices) provides the basic computing resources. The application programs (e.g.,database systems, games business programs (database systems, etc.) define the ways in which these resources are used to solve computing problems. The operating system controls and coordinates the use of the hardware resources among the various application programs for the various users. In doing so, one goal of the operating system is to make the computer system convenient to use. A secondary goal is to use the hardware in an efficient manner.

The Unix operating system is one example of an operating system that is currently used by many enterprise computer systems. Unix was designed to be a time-sharing system, with a hierarchical file system, which supported multiple processes. A process is the execution of a program and consists of a pattern of bytes that the CPU interprets as machine instructions (text), data and stack. A stack defines a set of hardware registers or a reserved amount of main memory that is used for arithmetic calculations.

The Unix operating system consists of two separable parts: the "kernel" and the "system programs." Systems programs consist of system libraries, compilers, interpreters, shells and other such programs that provide useful functions to the user. The kernel is the central controlling program that provides basic system facilities. The Unix kernel creates and manages processes, provides functions to access file-systems, and supplies communications facilities.

The Unix kernel is the only part of Unix that a user cannot replace. The kernel also provides the file system, CPU scheduling, memory management and other operating-system functions by responding to "system-calls." Conceptually, the kernel is situated between the hardware and the users. System calls are the used by the programmer to communicate with the kernel to extract computer resource information. The robustness of the Unix kernel allows system hardware and software to be dynamically configured to the operating system while applications programs are actively functional without having to shut-down the underlying computer system.

Thus, when system hardware or software resource changes are implemented in a computer system having the Unix operating system, the kernel is typically configured or reconfigured to recognize the changes. These changes are then made available to user applications in the computer system. Furthermore, as system errors and faults occur in the underlying operating system, the kernel is able to identify these errors and faults and make them available to applications that these error and faults may affect. Applications typically make system calls by way of "system traps" to specific locations in the computer hardware (sometimes called an "interrupt" location or vector) to collect information on these system errors. Specific parameters are passed to the kernel on the stack and the kernel returns with a code in specific registers indicating whether the action required by the system call was successfully completed or not.

Figure 1:
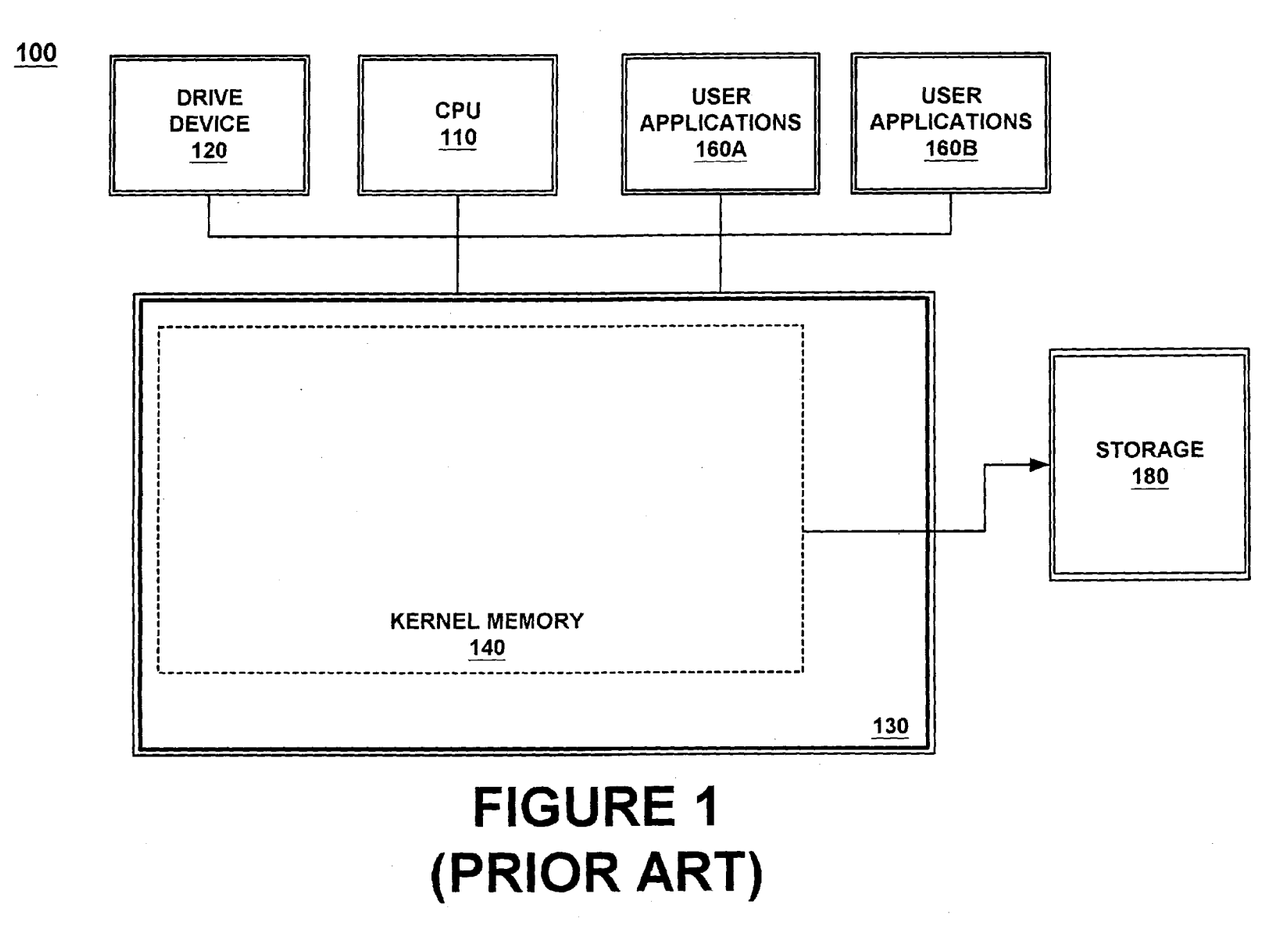
FIG. 1 is a block diagram of a prior art computer system.

FIG. 1 is a block diagram illustration of an exemplary prior art computer system 100. The computer system 100 is connected to an external storage device 180 and to an external drive device 120 through which computer programs can be loaded into computer system 100. The external storage device 180 and external drive 120 are connected to the computer system 100 through respective bus lines. The computer system 100 further includes main memory 130 and processor 110. The drive 120 can be a computer program product reader such a floppy disk drive, an optical scanner, a CD-ROM device, etc.

FIG. 1 additionally shows memory 130 including a kernel level memory 140. Memory 130 can be virtual memory which is mapped onto physical memory including RAM or a hard drive, for example. During process execution, a programmer programs data structures in the memory at the kernel level memory 140. User applications 160A and 160B are coupled to the computer system 100 to utilize the kernel memory 140 and other system resources in the computer system 100. In the computer system 100 shown in FIG. 1, when kernel events occur, each of the applications 160A and 160B have to independently perform poll or query operations to become aware of these events. Furthermore, each application has to initiate system calls to the kernel 140 to extract information on a particular event.

This typically results in the applications blocking or waiting for the kernel 140 to extract event information. Having the applications 160A and 160B independently issue system calls to the kernel to extract kernel event information further requires the applications to always preempt the kernel to extract event information. This can be inefficient, time consuming and costly. It may also require the applications to terminate or suspend other processes while preempting the kernel to extract kernel event information.

SUMMARY OF INVENTION

Accordingly, to take advantage of the many legacy application programs available and the increasing number of new applications being developed, a system is needed that allows a programmer to add extensions to a kernel to publish the occurrence of kernel level events to user level applications data without disrupting the functionality of the kernel for other operations. Further, a need exists to use existing legacy programs without having to recompile the underlying kernel in the operating system each time a new event is published from the kernel. A need further exists for an improved and less costly program independent operating system, which improves efficiency, reliability and provides a means to compile programs without losing the embedded features designed in these programs. A need further exists to reliably publish kernel level events to application programs and transparently filter events for other programs that have no need for these events.

What is described herein is a computer system having a kernel structure that provides a technique for monitoring and publishing kernel level events to user level applications by an asynchronous notification mechanism without having to recompile the kernel modules that publish the events. Embodiments of the present invention allow programmers to add system level loadable modules to existing kernel modules and provide a mechanism to extract and publish events to the user level applications without having user applications clogging the kernel with event query or poll requests. Embodiments of the present invention allow a system event framework in the kernel to publish the occurrences of hardware and software changes to specific user applications in a computer system. These kernel events may also include kernel errors and faults. Events detected by the kernel system event framework are asynchronously published to the user applications as they occur to avoid interruption of other operations of these applications.

The system event framework further provides users with a number of semantics that allow user level applications to subscribe to specific events in the kernel. The system event framework of the present invention further allows the non-interfering additions to a single entity without the need for pre-existing code to change.

Embodiments of the present invention further include kernel event publication logic that identifies kernel level events based on categories submitted by kernel subsystems and publishes these events as they occur to the specific applications. In one embodiment of the present invention, the kernel event publisher allows users to dynamically add to existing event characteristics based on unique identifiers to each event that an application wishes to subscribe.

Embodiments of the present invention also include event data system queues that dynamically queue the kernel events being monitored as they occur. The system event queues enable the kernel to buffer the system event data prior to dispatching the data to user level applications. The event data comprises a class and sub-class definition of the event. The event data also includes identification information that uniquely identifies each event for a particular application.

Embodiments of the present invention further include event data loadable modules that are implemented as intermediaries between the user applications subscribing to the kernel events and the kernel. The system event loadable modules receive all events published by the kernel and asynchronously distribute the events to the applications based on the class and unique identifier information. The system event loadable modules may be dynamically added to the system event framework dispatching daemon of the present invention without the need to recompile the underlying framework or event consumers or producers. The system event loadable modules also include acknowledgement logic that is triggered by each application when an event is received by the application to indicate receipt of the event. This allows the kernel to flush the system event queue of pending events after the events have been delivered. Further, system event loadable modules allow new features to be added to the base framework without recompilation of framework entities, a reboot of the operating system or restarting the system event daemon.

Embodiments of the present invention further include a system event daemon that accepts delivery of the kernel events and dispatches the events to the appropriate system event loadable module. The system event daemon monitors the system event loadable modules to ensure that events queued by the kernel are delivered to the appropriate applications. The system daemon further ensures that when event delivery is completed to the applications, the kernel is notified to flush the kernel event queues.

Embodiments of the present invention further include event subscription logic that allows user applications to subscribe to certain kernel events. The kernel event subscription logic is based on the event class and sub-class types. The event subscription logic establishes a connection between the system event daemon and the user application to create a connection path to deliver kernel event data to the applications. The event subscription logic also manages subscribers on behalf of the system event daemon and filters the kernel event buffers for each event subscriber in order to free kernel entries.

Embodiments of the present invention further include a system event configuration file registration feature that provides event information that is used by the present invention to determine when an application or script should be launched or invoked in response to a specific event. The system event configuration file feature is implemented as a loadable module to the system event framework daemon. As such, changes to the configuration file features may be made independent of the daemon and the base system event framework.

Embodiments of the present invention further include a device driver interface module that enables the addition of device drivers to enable individual user applications to independently publish a kernel level events. The device driver interface module further minimizes the number of interfaces a driver must use to log a system event.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to monitor kernel level events and to publish the occurrence of those events to subscribing user level applications. In accordance with an aspect of the invention, a kernel level event data monitoring system provides user applications the ability to dynamically receive notification of kernel events as they occur for particular applications transparently to the underlying operating system and the other applications running in the computer system.

Figure 2:
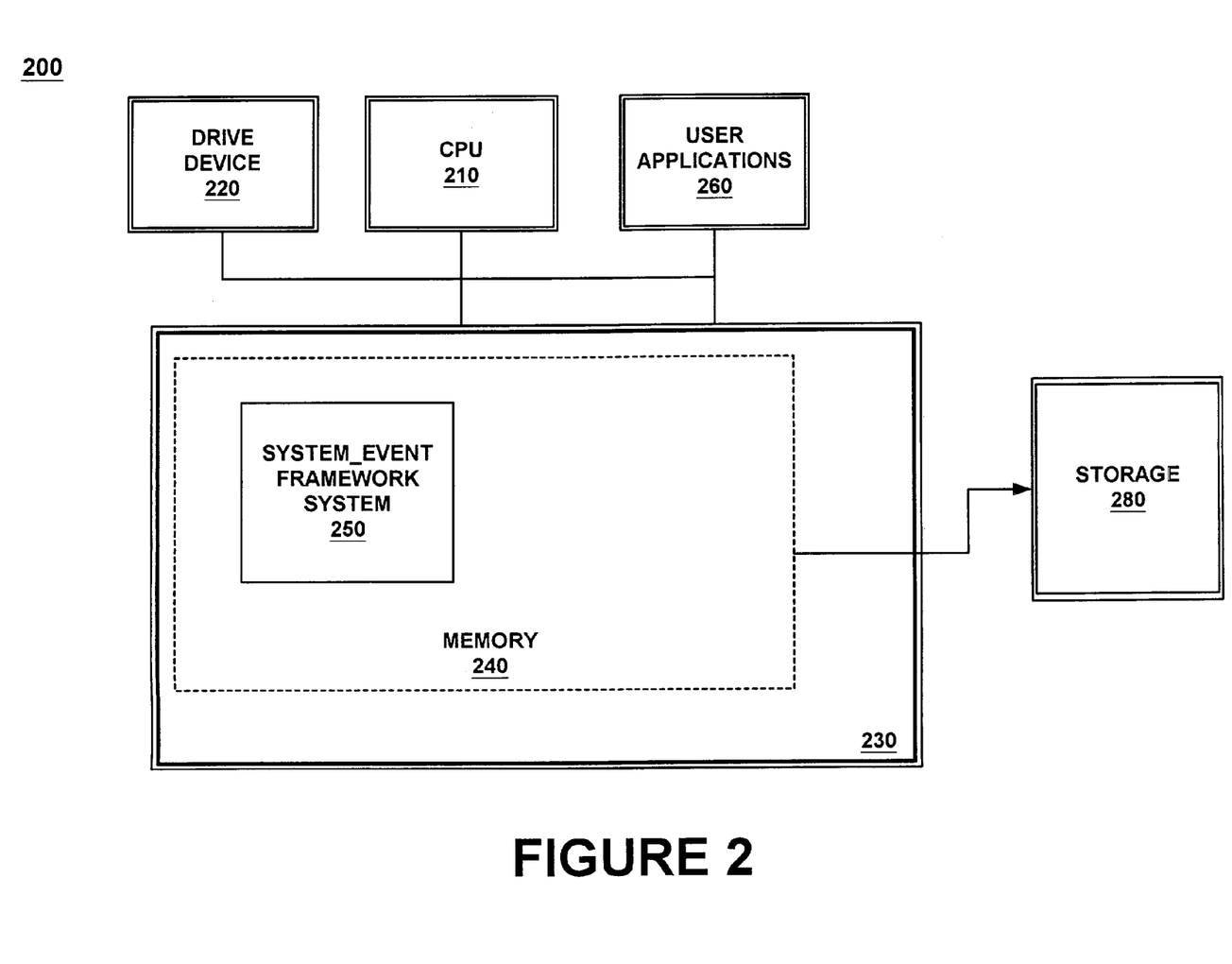
FIG. 2 is a block diagram of a computer system in accordance with an embodiment of the present invention.

FIG. 2 is a block diagram illustration of one embodiment of a computer system 200 of the present invention. The computer system 200 according to the present invention is connected to an external storage device 280 and to an external drive device 220 through which computer programs according to the present invention can be loaded into computer system 200. External storage device 280 and external drive 220 are connected to the computer system 200 through respective bus lines. Computer system 200 further includes main memory 230 and processor 210. Drive 220 can be a computer program product reader such a floppy disk drive, an optical scanner, a CD-ROM device, etc.

FIG. 2 shows memory 230 including a kernel level memory 240. Memory 230 can be virtual memory which is mapped onto physical memory including RAM or a hard drive, for example, without limitation. During process execution, a programmer programs data structures in the memory at the kernel level memory 240. According an embodiment of the present invention, the kernel memory level includes a kernel level system event framework system (KLFS) 250. The KLFS 250 enables a programmer to subscribe to and monitor kernel level events for particular user level applications 260 that the programmer is implementing and the KLFS 250 dynamically notifies the intended applications 260 of the occurrence of such events. The notification of the subscribed events as they occur are non-interfering to other applications that may be running on the user's computer system.

The KLSF 250 comprises application interfaces for kernel level publication and applications interfaces for user level notification of events occurring in the kernel 240. The KLFS 250 provides a standardized event buffer and payload (e.g., data) that is delivered to the subscribing user applications. The KLFS 250 further comprises libraries to extract event data from the event buffers and a daemon that dispatches the events to the user level applications.

Figure 3:
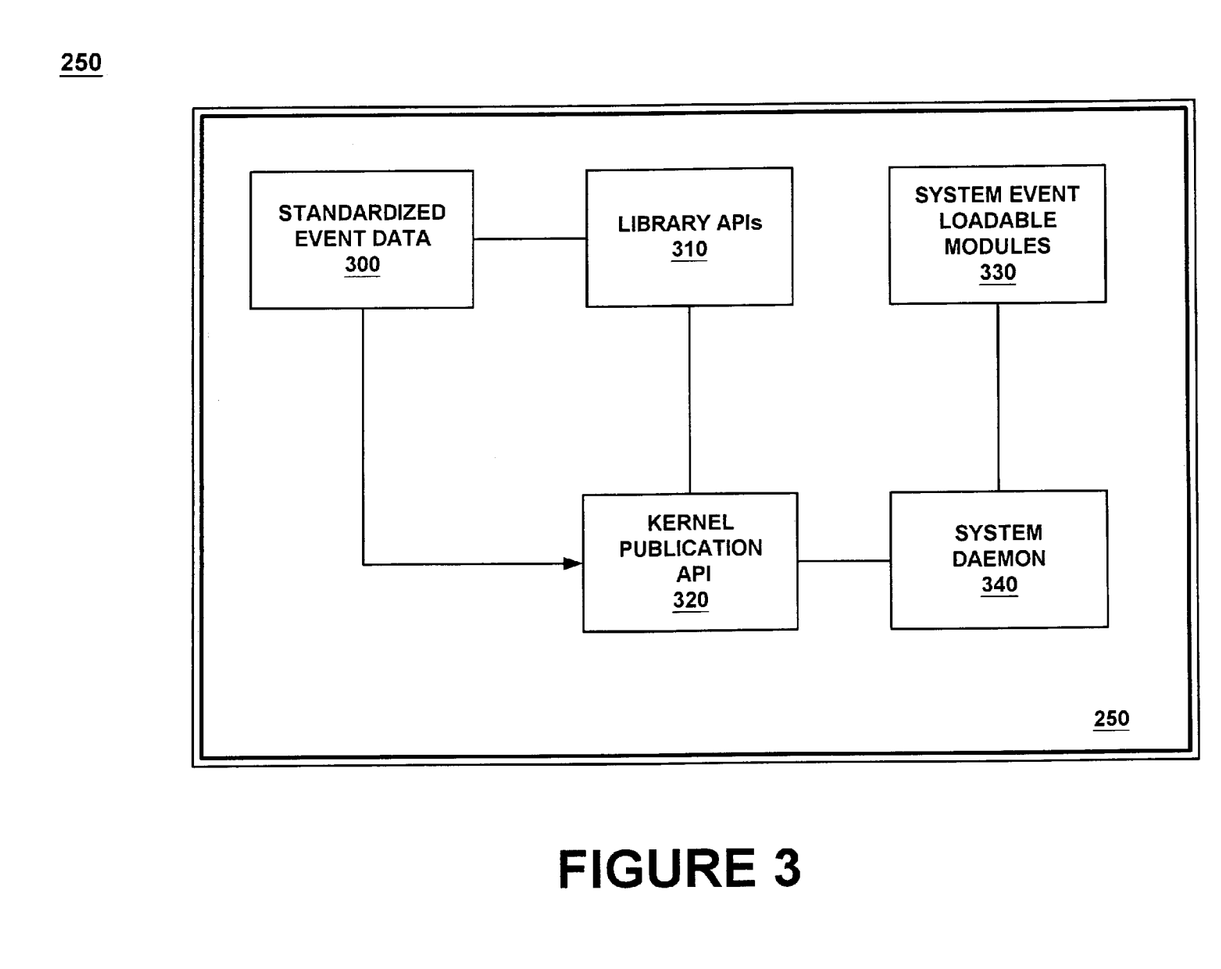
FIG. 3 is a block diagram of an embodiment of the kernel event monitoring framework system of the present invention.

FIG. 3 is a block diagram illustration of one embodiment of the kernel level system event monitoring framework system (KLFS) 250 of the present invention. The KLFS 250 comprises standardized event data module 300, application interface (API) library module 310, kernel publication module 320, system event loadable (SLM) module 330 and system daemon module 340.

The standardized event data module 300 provides event handles to particular system event objects. The system event types may include a class of related event conditions or a subclass of particular conditions with a class. The event data module also provides a set of unique event identifiers that provides high resolution timestamp and sequencing numbers to uniquely identify events as they occur in the kernel 240.

The event data module 300 further provides a set of publisher identifiers that uniquely identifies each kernel event subscriber. The publisher identifiers differentiate the same event type generated from different sources or publishers. In one embodiment of the present invention, the event data module 300 further generates a set of unique data attributes that comprise a set of name-value pairs that further describe the event conditions as they occur in the kernel 240.

The kernel event publication module 320 publishes the events as they occur in the kernel 240. In one embodiment of the present invention, each event contains a number of buffers with a set of header information. The header information is typically filled in by the KLFM 250, except the class and sub-class information. The event buffer also contains a publisher identifier which allows the KLFS 250 to differentiate the same event from different sources. The kernel event publisher 320 also provides the data payload containing specific data that a specific publisher requires.

The kernel event publication module 320 is preferably a set of routines that serve as the building blocks to the kernel's subsystem specific modules, such as the device driver interface (DDI). The kernel event publication module 320 also allocates memory for each event handle provided along with each subscription request to the KLFS 250. The kernel event publication module 320 further frees memory associated with each event handle, e.g., freeing of header and any attribute data.

In one embodiment of the present invention, the event publication module 320 also adds new attributes (name-value pair) to any system event attribute list that is created by the KLFS 250 by creating the list if the data will be the first attribute element on the list. The event publication module 320 also attaches attribute data to a previously allocated event object and similarly detaches attribute data from event objects.

Still referring to FIG. 3, the system event loadable module (SLM) 330 acts as an intermediary between the user applications programs 260 making event subscriptions and the kernel 240. The SLM 330 receives all events as they occur in the kernel 240 and passes the events on to the requesting applications 260. In one embodiment of the present invention, the kernel level events are buffered and queued for presentation to the SLM 330.

The SLM 330 further provides a mechanism to allow the programmer (user) to add special features to the system event daemon on the user's computer. The SLM 330 primarily acts based on the event type being monitored in the kernel and subscribed by the applications program. Event buffers generated by the kernel 240 are filtered and passed by the SLM 300 to other applications in the computer system 200 as needed.

The SLM 330 also provides the KLFS 250 a level of reliability to deliver kernel events to the subscribing applications. In one embodiment of the present invention, the SLM 330 communicates with the overlying applications 260 in a one-to-one relationship to ensure that events generated for a particular application are not mistakenly delivered to another application. The SLM 330 includes acknowledgement logic that acknowledges receipt of buffered event designated to the SLM 330. The acknowledgement logic enables the KLFS 250 to release buffered events or retry delivery.

The system daemon module 340 typically resides on the user's computer system and communicates to the KLFS 250 via an interface. The system daemon module 340 primarily communicates with the kernel 240 with the SLM 330 acting as clients of the system daemon 340. The system daemon module 340 accepts delivery of system event objects from the kernel 240 and through a dispatching thread temporarily places the buffered events data on each SLM 330 client queue.

Once an event delivery is made to the SLM 330, the buffer is removed based on the acknowledgement receipt sent by the SLM 330 to the system event daemon 340. There are several reasons for the SLM 330 to acknowledge receipt of an event delivery. One is to ensure that the event data buffers are not freed from the kernel 240 until the SLM 330 confirms it has received the event. Another is to allow the SLM 330 to request that delivery be retried if it is not able to process the event data immediately. In one embodiment of the present invention, the system event daemon dispatches the event data in a multi-threaded process to each respective SLM 330.

Figure 4:
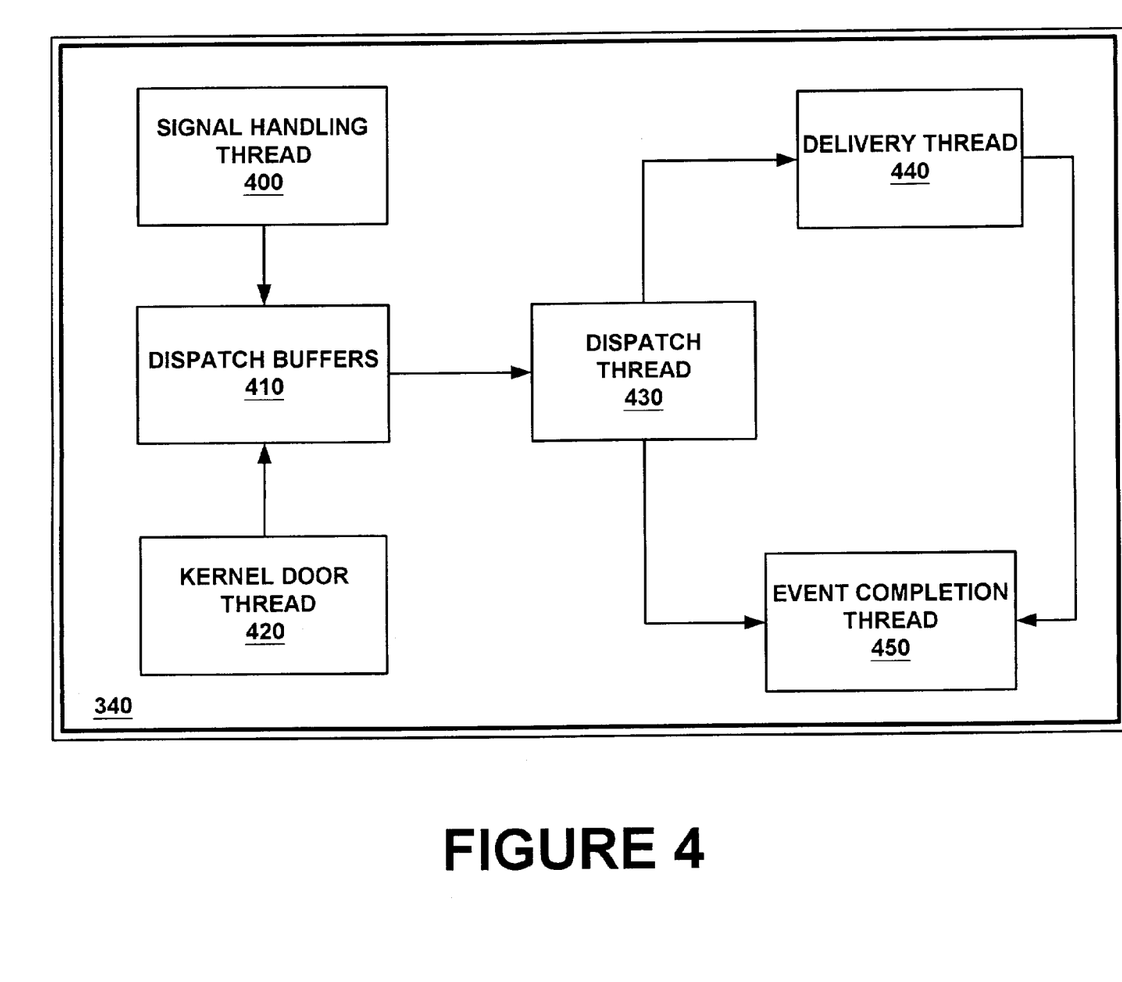
FIG. 4 is a block diagram of one embodiment of an internal architecture of a system event daemon of one embodiment of the kernel event monitoring framework of the present invention.

Reference is now made to FIG. 4 which is a block diagram illustration of one embodiment of the system event daemon 340 of the present invention. As depicted in FIG. 4, the system event daemon 340 comprises signal handling thread module 400, dispatch buffers 410, kernel door server thread 420, dispatch thread 430, delivery thread 440 and event completion thread 450.

The signal handling thread 400 receives signal handles from the applications 260 and coordinates draining of the SLM 330 queue as the data in the queues of the dispatch buffers 410 are delivered to the SLM 330. Upon delivery of the queued buffered data, the signal handling thread 400 sends a completion signal to the kernel 240 to indicate completion of all event data delivery. This causes all outstanding event data deliveries to be flushed from the system event daemon 340. The signal handling thread 400 then revokes the kernel door 420. The signal thread 400 also waits for signals, e.g., HUP, INT, STOP and TERM to gracefully shut down the system event daemon. In one embodiment of the present invention, if the HUP signal is presented to the signal thread 400, the SLMs 330 are unloaded and then reloaded.

The kernel door server thread 420 handles door up-calls from the kernel and copies event objects into a waiting buffer in the dispatch buffers 410. If the buffer 410 is unavailable, the kernel door server thread 420 returns a "not-available" signal. The kernel doors 420 typically are a mechanism by which the kernel 240 communicates with user level processes such as the system event daemon 340.

The dispatch thread 430 provides a mechanism through which the event buffers 410 are dispatched to each client (e.g., SLMs 330). These dispatches are accomplished by placing the buffers on a per-client event queue. Once an event buffer has been dispatched to all clients, a completion package is placed on the completion queue 450. The completion package contains the event identifier and the client reference count.

The event delivery thread 440 delivers the event data to each client subscribing to the event. Each client delivery thread extracts the next event buffer on its queue and calls the appropriate SLM 330 delivery routine to implement delivery of the event data. After a successful return from the SLM 330, the buffer is removed from the buffer queue 410 and an event completion is signaled to the event completion thread 450 for the particular client.

Once all clients have signaled completion of processing a particular event buffer 410, the event is released from the kernel by the event completion thread 450.

Figure 5:
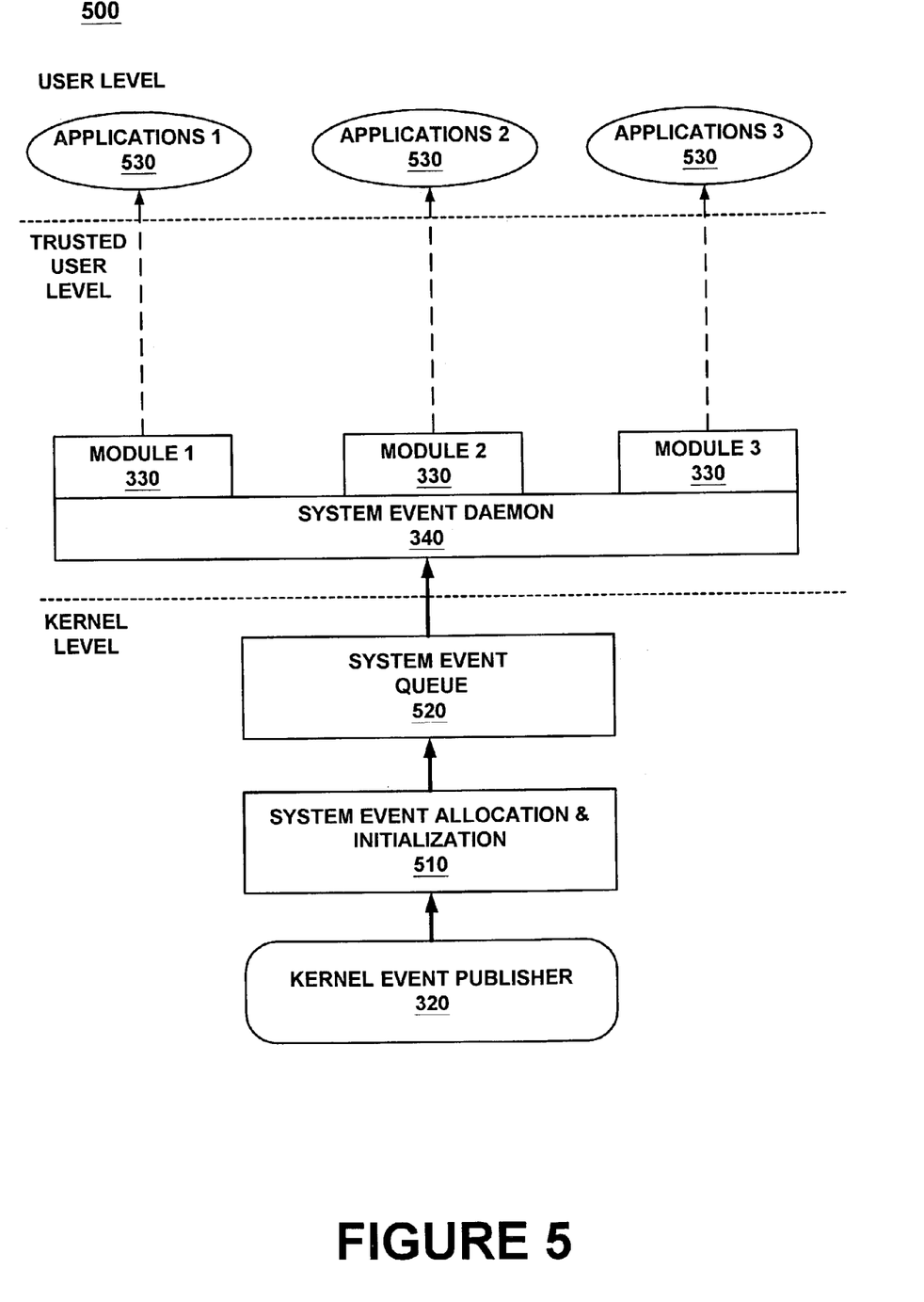
FIG. 5 is a block diagram of one embodiment of a system event flow of the kernel event monitoring framework of the present invention.

FIG. 5 is a data flow diagram of one embodiment 500 of the flow of data in the kernel system event framework 250 of the present invention. As shown in FIG. 5, events generated by the kernel 240 are published by the event publisher 320 to the subscribing applications 530. Each event is stored in an event buffer with associated payload (data). The event buffer is first allocated and initialized with event specific data provided by the kernel event publisher 320 and system specific identification (e.g., timestamp and sequencer). The event buffer is subsequently queued in the system event queue 520 for delivery to the system daemon 340. Each event buffer includes a set of header information. The header information is typically filled in by the system event framework 250, except the class and sub-class information.

Each system event buffer includes an event type, which comprises a class and a sub-class. An event class typically defines a set of related event conditions and the sub-class defines a particular condition within the class. The event buffers also include a unique event identifier that is unique to each event buffer in the system queue 520. In one embodiment of the present invention, the event identifier comprises a high resolution time stamp and a sequence number for each event. An exemplary event may be defined as follows:

event header
    class
    subclass
    timestamp
    sequencer
    vendor
    publisher
    self-describing event* class-specific data (e.g., name-value pairs).

where:
    class is the class of the event;
    sub-class is the sub-class of the event;
    vendor is the name of the vendor defining the event, for example the stock symbol of the vendor;
    publisher is the name of the application, driver or system module producing the event;
    timestamp is a high resolution time assigned at event buffer initialization time;
    sequencer is a monotonically increasing value assigned at initialization time.

Events from the system event queue 520 are extracted by the system daemon 340. The daemon 340 retrieves from the system event queue 520 the event buffers and through a dispatching thread places the buffers in each respective client's (applications 530) queue for delivery. Each of the applications 530 has an event buffer queue that stores events generated by the kernel 240.

Once delivery is made to each of the modules 1–3, the buffer is removed from the daemon's event completion thread. In one embodiment of the present invention, the event buffers are not removed from the daemon's event completion thread until each of modules 1–3 confirms receipt of the event. Confirmation of the receipt of events ensures the reliable delivery of events to the SLMs 330.

Figure 6:
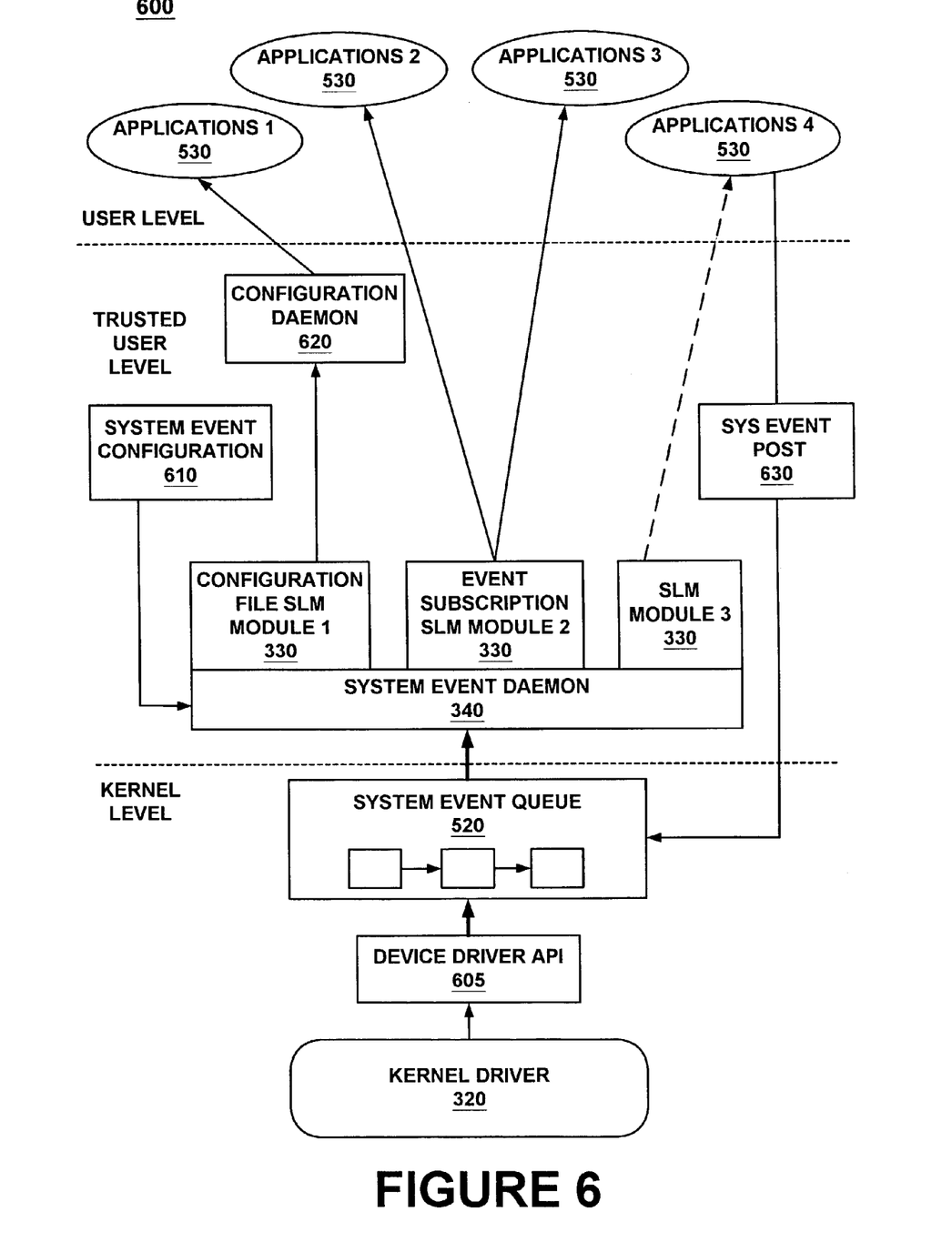
FIG. 6 is a block diagram of another embodiment of the system event flow of the kernel event monitoring framework of the present invention.

FIG. 6 is a data flow diagram of another embodiment 600 of event data flow in the present invention. In the embodiment disclosed in FIG. 6, a configuration file 610, a configuration file daemon 620 and a sys event post file 630 are added to the kernel system event framework 250. Based on the contents of the configuration file 610, an application is launched or invoked in response to a particular event.

The configuration file 610 provides class, sub-class, publisher and arbitrary attribute data that is used to indicate when an application should be launched. For example, if a user wishes to subscribe to event information for when a printer is either configured or de-configured to the system, the configuration file 610 is configured with the printer name, etc. The printer detect logic in the kernel 240 is invoked to configure the printer information in the kernel sub-systems and generate an event (e.g., addition of a new printer) to all applications subscribing to be notified of the addition or deletion of printers from the kernel 240.

An exemplary configuration file of one embodiment of the present invention is as follows:

```
"class; sub-class; vendor; publisher; reserved1; reserved2; path[arg1
arg2 . . . ]"
For example: with an event described by:
class  event  vendor  pub  user  flag  service      [arg1 arg2 . . . ]
ec_conf esc_dc QQQ qd - - /opt/QQQ/qd/bin/qdconfig -c
${device_name}
``` where:
  class is the class of the event;
  sub-class is the sub-class of the event;
  vendor is the name of the vendor defining the event, for example the stock symbol of the vendor;
  publisher is the name of the application, driver or system module producing the event;
  timestamp is a high resolution time assigned at event buffer initialization time;
  sequencer is a monotonically increasing value assigned at initialization time.

The sys event post API 630 allows user level applications to generate events similar to events generated by the kernel 240. In the embodiment shown in FIG. 6, the system event framework 250 further includes a device driver system event interface 605. A wrapper function logic in the system event post event file 630 enables the addition of a device driver interface (DDI) that allows device drivers to call the SLMs 330 to place events. The DDI interface calls specific driver interface conventions and returns DDI specific errors in case of a failure. In one embodiment of the present invention, the DDI interface minimizes the number of interfaces a driver must use to publish system events.

Figure 7:
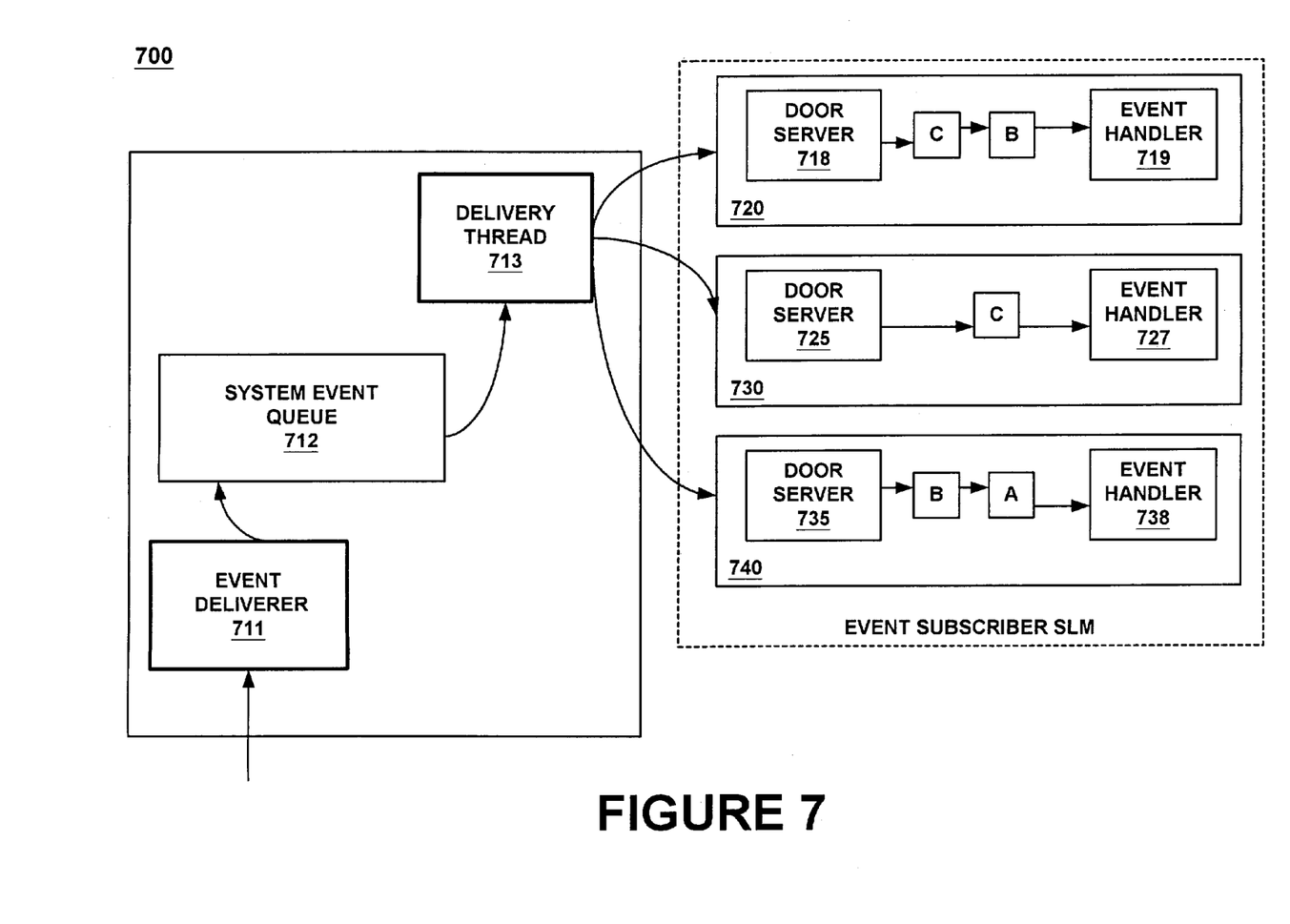
FIG. 7 is a block diagram of one embodiment a public registration interface for user applications to the kernel event monitoring framework of the present invention.

FIG. 7 is a block diagram illustration of one embodiment of system event subscription logic 700 of the present invention. The system event subscription logic 700 provides a mechanism for the system event framework to establish connections between the system event daemon and a subscribing application. A handle is created to hold the connection path and the subscribing application. The system event subscription logic 700 further provides the kernel system event framework 250 with a mechanism to free previously allocated system event handles generated by the system event daemon 340 after events have been delivered to the subscribing applications. The system event subscription logic 700 further includes a system event unsubscribe logic that allows the system event framework 250 to disable delivery of system event notifications to subsequent system events that occur in the kernel according to a system event type list. In one embodiment of the present invention, the system event type list may be used to subscribe to events of interest to the subscribing application.

The event subscription feature is implemented as a special purpose SLM 330. User applications may engage in event subscription in the present invention through library interface 310 that establishes and maintains event subscription connection paths between the event subscription SLM and the subscribing application. The system event daemon 340 opens the libraries and delivers event buffers to the SLMs 330 and the SLM 330 in turn delivers the event buffers to the user application. The event buffers are asynchronously delivered to the user application via, for example, call back routines in which system programs deliver the event buffers to the user applications.

In the example shown in FIG. 7, events from the system event daemon 340 are passed to the event dispatcher 711 and queued for delivery in the system event queue module 712. The queued events are then provided to the event delivery module 713 which delivers the events to the event subscriber SLM. The event subscriber SLM in-turn makes door calls to the door server 718, 725 and 735 for each respective subscriber application 720, 730 and 740 to make delivery of each respective system event buffer (A–C) to each respective application. Each of the event handles 719, 727 and 738 establishes a connection between the system event daemon 340 and the subscribing application. The handle holds the connection path (e.g., file system name) and the calling applications' event delivery routine. After an event is delivered, the handles respectively close the connection between the system event daemon and the calling application and frees the system event daemon handles previously allocated.

Figure 8:
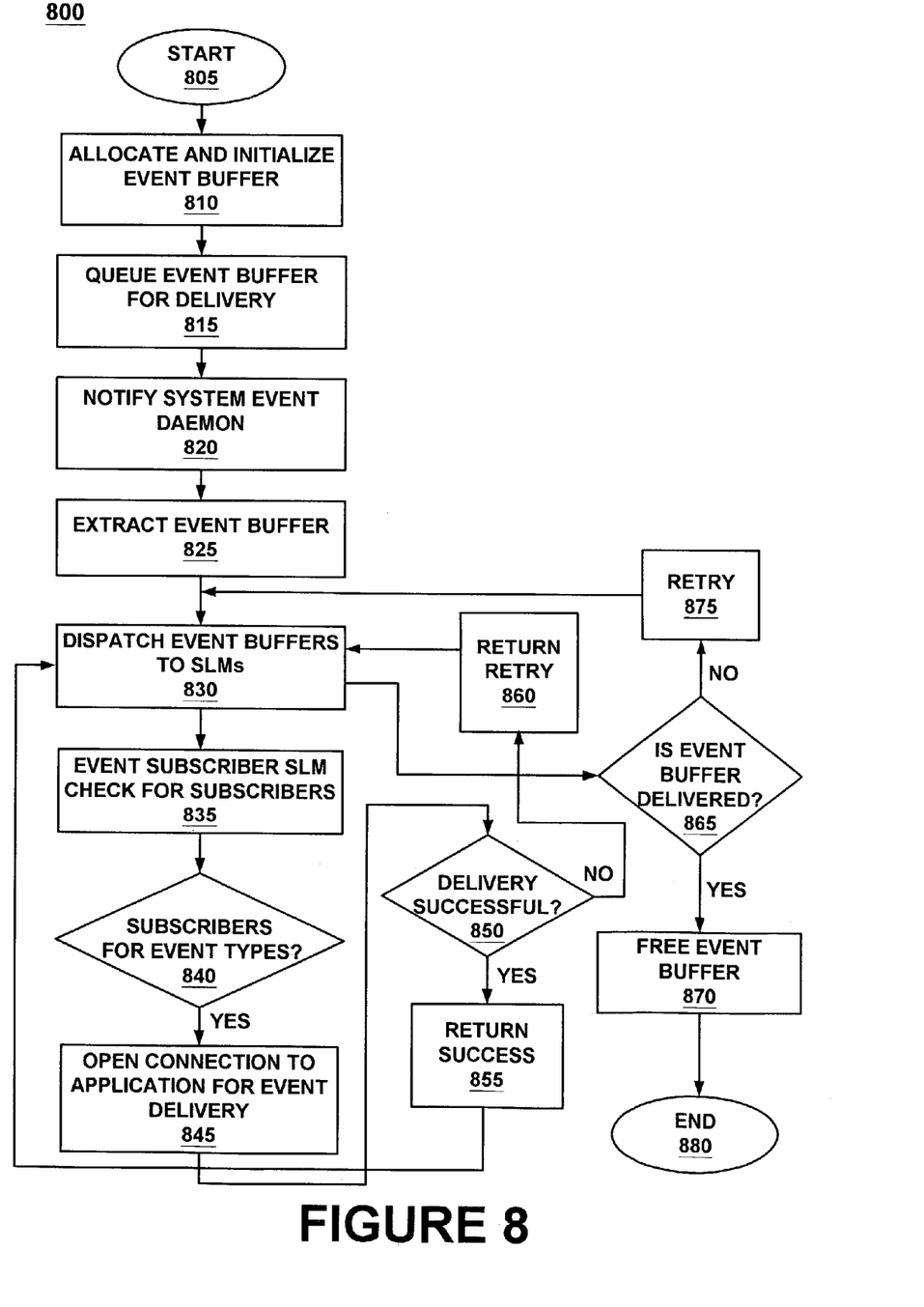
FIG. 8 is a flow diagram illustration of one embodiment of an event subscription and publication of the kernel event monitoring framework of the present invention.

FIG. 8 is an exemplary computer controlled flow diagram of one embodiment of event subscription and delivery of the present invention. As shown in FIG. 8, implementation of an event subscription and delivery is initiated by a computer system user application subscribing to the kernel system framework 250 event notification logic for particular events. At step 810, the kernel system framework 250 allocates and initializes event buffers for the events being subscribed. At step 820, the framework 250 queues the event buffers for delivery. After the event buffers have been queued, the framework 250 notifies the system event daemon 340 of the queued events.

At step 825, the queued event buffers are extracted and dispatched at step 830 to the corresponding SLMs 330. At step 835, the event subscription SLM 330 checks for subscribing users or applications to the queued events. At step 840, the subscribing SLM 330 determines whether the identified subscribers have subscribed to a particular event type.

If the identified subscribers have subscribed to the specific event type determined by the subscribing SLM 330, the framework 250 opens connection to the particular application for event delivery at step 845.

At step 850, the framework 250 checks to determine whether a queued event buffer has been successfully delivered to the subscribing application. If the event has been successfully delivered, the framework 250 returns success at step 855 to the dispatching SLM 330 and continues delivery of other events in the queue buffer. If an event is unsuccessfully delivered, a return retry is signaled to the dispatching SLM 300 at step 860.

At step 865, the framework 250 performs a second check to determine whether an event buffer has been delivered. If during this check the event buffer has been delivered, the event buffer is freed at step 870 and processing ends at step 880. If, on the other hand, the event buffer has not been delivered, the framework 250 performs a delivery retry at step 875, to re-deliver the event buffer.

In a typical operation of one embodiment of the KLFS 250, the event publisher 310 calls the system event allocation and initialization module 510. The system event allocation and initialization module 510 has the event data which includes the class, sub-class, publisher identifier and attribute data. The KLFS 250 then places the event data into a single buffer for each event. The system daemon 340 in communicating with the kernel 240 extracts the event buffers stored in the system event log 320 and dispatches the event data to the SLMs 330 which subsequently place the event buffers in each subscribing applications individual event buffers. For example, if there is a fault condition in the kernel 240 as a result of a device driver receiving many time-outs at its ports. The kernel 240 will call the system event log 320 to log the particular condition. The KLFS 250 will then compose the fault event class as, for example, "an ec_fault"; a sub-class will be defined as "time-outs" and the KLFS 250 will fill the unique identifier for the event and the event publisher will further publish the event in terms of the attribute data.

In this example, the attribute data will be defined as a set of name-pair value (e.g., time-out with an intrinsic value specifying the time-out limit). Applications subscribing to this event will extract the event data and notice the time-out limit (e.g., 3) and will be able to dynamically adjust processing to the specific device driver when the time-out is over.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A computer system comprising:
   a processor;
   a memory storage unit;
   an operating system comprising a kernel, said kernel comprising a kernel system event monitoring and publishing system for detecting and reporting kernel system events in said kernel;
   a plurality of subscribing user application programs communicatively coupled to said kernel to subscribe to receive said kernel system events;
   an event subscription module for enabling said user applications programs to subscribe to said kernel system events; and
   a system daemon defined to accept kernel system event objects from the kernel and place said kernel system event objects in appropriate client event queues, wherein said system daemon includes an event completion thread for releasing client event queues after said plurality of subscribing user application programs have completed processing said kernel system event objects present in said client event queues.

2. The computer system of claim 1, further comprising an event notification module for notifying said plurality of subscribing user application programs on the occurrence of said kernel system events.

3. The computer system of claim 2, further comprising an event publication module for publishing the occurrence of said kernel system events to said plurality of subscribing user application programs.

4. The computer system of claim 1, wherein said system daemon is multithreaded to allow per-client event dispatching to said plurality of subscribing user application programs.

5. The computer system of claim 3, further comprising a system event queue for storing event occurrences generated by said kernel.

6. The computer system of claim 5, further comprising a system event buffer for storing a plurality of system event data, each representing a specific system event occurrence in said kernel.

7. The computer system of claim 6, further comprising a plurality of programmable system loadable modules for performing a dynamic add-on event notification and publication for said plurality of subscribing user application programs.

8. The computer system of claim 1, wherein said system daemon comprises a system signal handling thread for controlling the operations of said system daemon.

9. The computer system of claim 8, wherein said system daemon further comprises an event dispatching thread for selectively dispatching system events to a corresponding ones of said plurality of subscribing user application programs as said events occur.

10. The computer system of claim 1, wherein said system daemon further comprises an event delivery thread for delivering said kernel system events to each of said plurality of subscribing user applications programs as said events occur.

11. The computer system of claim 10, wherein said kernel system events comprise kernel level hardware events.

12. The computer system of claim 11, wherein said kernel system events further comprise kernel level software events.

13. The computer system of claim 12, wherein said kernel system events further comprise kernel level system errors and faults.

14. The computer system of claim 1, wherein said event subscription module comprises event disabling logic for disabling delivery of system event notifications according to a plurality of user application program's event type list.

15. The computer system of claim 14, wherein said event subscription module further comprises system event unbinding logic for closing connections between said plurality of user application programs and a system event daemon to free up system event handles previously allocated to particular ones of said user application programs.

16. A computer operating system comprising:
   a kernel comprising a plurality of subsystems;
   a system event monitoring and notification system for monitoring and notifying user application programs subscribing to said kernel regarding the occurrence of kernel level system events; and
   system event subscription logic defined within said system event monitoring and notification system, said system event subscription logic including system event unbinding logic for closing connections between said subscribing user application programs and said kernel.

17. The computer operating system of claim 16, wherein said system event monitoring and notification system comprises an event publication logic for publishing occurrence of said kernel level system events to said user application programs subscribing to said kernel level system events.

18. The computer operating system of claim 17, wherein said system event monitoring and notification system further comprises event data logic for storing event specific information regarding said kernel level system events.

19. The computer operating system of claim 16, wherein said system event monitoring and notification system comprises a programmable system event loadable module for performing dynamic add-on event notification and publication for said user application programs.

20. The computer operating system of claim 19, wherein said kernel system event monitoring and notification system further comprises a set of application interfaces for extracting event data representing said kernel level system events from said kernel.

21. The computer operating system of claim 16, wherein said system event monitoring and notification system further comprises a system daemon for accepting of event objects from the kernel.

22. The computer operating system of claim 21, wherein said system daemon is multi-threaded to allow per-client event dispatching to said subscribing user application programs.

23. The computer operating system of claim 22, wherein said system event monitoring and notification system further comprises a system event queue for tracking system event buffers in said kernel.

24. The computer operating system of claim 23, wherein said kernel system event monitoring and notification system further comprises system event post event logic for enabling user applications to directly publish kernel level events from the computer operating system.

25. In an operating system, a kernel event publication system, comprising:
   a kernel;
   a system event notification module for notifying user application programs of kernel level system events;
   a plurality of kernel drivers;
   a kernel system event log;
   a kernel system event buffer;
   a plurality of system event loadable modules including event queues associated with said user application programs; and
   a system daemon defined to dispatch system events to said event queues, said system daemon including an event completion thread for releasing said event queues after said user application programs have completed processing system events dispatched to said event queues.

26. The kernel event publication system of claim 25, further comprising a system event configuration file for enabling user level applications and users to specify applications and scripts to be invoked in response to particular system events.

27. The kernel event publication system of claim 26, further comprising a system event configuration daemon for controlling the operations of said event configuration file.

28. The kernel event publication system of claim 27, further comprising system event detection logic for detecting system events occurrences in said kernel.

29. The kernel event publication system of claim 28, further comprising a system event post event logic for enabling said user level applications to generate said system events.

30. The kernel event publication system of claim 29, wherein said system daemon comprises a system signal handling thread for controlling the operations of said system daemon.

31. The kernel event publication system of claim 30, wherein said system daemon further comprises an event dispatching thread for selectively dispatching said system events to said user level applications as said system events occur.

32. In a computer system, a computer implemented kernel event publication system comprising:
   kernel event detection logic for detecting kernel events subscribed by user application programs in the computer system;
   kernel event publication logic for publishing the occurrence to said kernel events to said user application programs, said kernel event publication logic including event queuing logic for queuing said kernel events in event buffers designated for each of said user application programs subscribing to said kernel events; and
   kernel event dispatching logic for dispatching kernel data associated with said kernel events to said user application programs subscribing to said kernel events.

33. A system as described in claim 32 wherein said kernel events define changes in hardware configurations to a kernel in said computer system.

34. A system as described in claim 33 wherein said kernel events also define changes in software configurations to said kernel.

35. A system as described in claim 34 wherein said kernel events also define errors occurring in said kernel.

36. A method of publishing system kernel level events of a computer operating system to user level applications, said method comprising:
   defining a set of kernel level events for monitoring;
   subscribing user level applications to said kernel level events, wherein said subscribing includes allocating system event handles to hold a connection path between subscribed user level applications and a distributor of said kernel level events;
   detecting the occurrence of kernel level events; and
   publishing said kernel level events to said user level applications; and
   releasing said system event handles following publication of said kernel level events to said user level applications.

37. The method of claim 36, wherein said publishing said kernel level events comprises determining event specific characteristics defining said kernel level events.

38. The method of claim 37, wherein said publishing said kernel level events further comprises invoking a kernel system call to an event system queue to extract respective event specific information of each of said kernel level events.

39. The method of claim 38, wherein said publishing said kernel level events further comprises buffering said event specific information prior to delivering said event specific information to said user level applications.

40. The method of claim 39, wherein said event specific information comprises a unique identifier defining the user level applications designated to receive said kernel level events.

* * * * *